United States Patent
McGrath et al.

(10) Patent No.: US 10,489,609 B1
(45) Date of Patent: Nov. 26, 2019

(54) RESTRICTING PROGRAMMABLE INTEGRATED CIRCUITS TO SPECIFIC APPLICATIONS

(71) Applicant: Xilinx, Inc., San Jose, CA (US)

(72) Inventors: John E. McGrath, Cahir (IE); Brendan Farley, Donabate (IE); Anthony J. Collins, Dublin (IE); Matthew H. Klein, Redwood City, CA (US)

(73) Assignee: XILINX, INC., San Jose, CA (US)

( * ) Notice: Subject to any disclaimer, the term of this patent is extended or adjusted under 35 U.S.C. 154(b) by 183 days.

(21) Appl. No.: 15/615,633

(22) Filed: Jun. 6, 2017

(51) Int. Cl.
| | |
|---|---|
| H04L 9/32 | (2006.01) |
| G06F 11/30 | (2006.01) |
| G06F 11/00 | (2006.01) |
| H04L 9/00 | (2006.01) |
| G06F 9/455 | (2018.01) |
| G06F 21/62 | (2013.01) |
| G06F 17/50 | (2006.01) |
| G06F 21/72 | (2013.01) |

(52) U.S. Cl.
CPC ........ G06F 21/629 (2013.01); G06F 17/5045 (2013.01); G06F 21/62 (2013.01); G06F 21/72 (2013.01)

(58) Field of Classification Search
CPC .... G06F 21/629; G06F 21/62; G06F 17/5045; G06F 21/72
USPC ............... 380/277; 713/168, 189; 726/34; 716/111
See application file for complete search history.

(56) References Cited

U.S. PATENT DOCUMENTS

| | | | |
|---|---|---|---|
| 5,912,937 A | 6/1999 | Goetting et al. | |
| 6,415,032 B1 | 7/2002 | Doland | |
| 6,748,368 B1 | 6/2004 | Trimberger et al. | |
| 6,817,006 B1 * | 11/2004 | Wells ............. | G01R 31/318519 716/112 |
| 6,894,527 B1 | 5/2005 | Donlin et al. | |
| 6,931,543 B1 | 8/2005 | Pang et al. | |
| 7,117,372 B1 | 10/2006 | Trimberger | |
| 7,243,227 B1 | 7/2007 | Knapp | |
| 7,380,131 B1 | 5/2008 | Trimberger | |
| 7,408,381 B1 | 8/2008 | Drimer et al. | |
| 7,519,823 B1 | 4/2009 | Schumacher et al. | |
| 7,623,660 B1 | 11/2009 | Cory | |
| 7,716,497 B1 | 5/2010 | Trimberger | |

(Continued)

OTHER PUBLICATIONS

McNeil, Steven, "Solving Today's Design Security Concerns," WP365 (v1.2), Jul. 30, 2012, pp. 1-14, Xilinx, Inc., San Jose, California, USA.

(Continued)

*Primary Examiner* — Aravind K Moorthy
(74) *Attorney, Agent, or Firm* — LeRoy D. Maunu

(57) ABSTRACT

Disclosed approaches for limiting use or a programmable IC involve a provider of programmable ICs generating, using one or more private keys of the provider, one or more signed configuration bitstreams from one or more circuit designs received from a customer. The provider changes the general purpose programmable IC into an application programmable IC that can only be programmed by the one or more signed configuration bitstreams. The application programmable IC and the one or more signed configuration bitstreams are provided from the provider to the customer.

17 Claims, 4 Drawing Sheets

(56) References Cited

U.S. PATENT DOCUMENTS

| | | | |
|---|---|---|---|
| 7,853,799 B1 | 12/2010 | Trimberger | |
| 7,941,673 B1 | 5/2011 | Trimberger | |
| 8,355,502 B1 | 1/2013 | Donlin et al. | |
| 9,218,505 B1* | 12/2015 | Wesselkamper | G06F 21/72 |
| 9,576,095 B1* | 2/2017 | Hew | G06F 17/5068 |
| 2002/0023217 A1* | 2/2002 | Wheeler | G06F 21/32 |
| | | | 713/171 |
| 2003/0055321 A1* | 3/2003 | Watrous | A61B 7/00 |
| | | | 600/300 |
| 2004/0059925 A1* | 3/2004 | Benhammou | G06F 12/1458 |
| | | | 713/189 |
| 2004/0216081 A1* | 10/2004 | Wells | G01R 31/318519 |
| | | | 716/117 |
| 2005/0022147 A1* | 1/2005 | Sato | G06F 17/5045 |
| | | | 716/102 |
| 2015/0234008 A1* | 8/2015 | Miller | G01R 31/3177 |
| | | | 714/734 |
| 2015/0242620 A1* | 8/2015 | Newell | G06F 21/44 |
| | | | 726/30 |
| 2016/0148241 A1* | 5/2016 | Walsh | G06Q 30/0225 |
| | | | 705/14.26 |
| 2017/0244562 A1* | 8/2017 | He | H04L 9/08 |
| 2018/0004879 A1* | 1/2018 | Arunagiri | G06F 17/5045 |
| 2018/0091484 A1* | 3/2018 | Atta | H04L 63/0428 |
| 2018/0227145 A1* | 8/2018 | Brochi | H04L 12/40 |

OTHER PUBLICATIONS

Wilkinson, Kyle, "Using Encryption and Authentication to Secure an UltraScale/UltraScale+ FPGA Bitstream," XAPP1267 (v1.0), Jun. 2, 2016, pp. 1-24, Xilinx, Inc., San Jose, California, USA.

* cited by examiner

RESTRICTING PROGRAMMABLE INTEGRATED CIRCUITS TO SPECIFIC APPLICATIONS

TECHNICAL FIELD

The disclosure generally relates to limiting programmable integrated circuits to particular circuit designs.

BACKGROUND

The U.S. government restricts exports of various products for purposes of national security, foreign policy, control of crime and other reasons of national interest. Export controls are drafted sufficiently broad to adequately protect national interests. However, broad export controls may be overly restrictive for certain technologies and prevent some commercial interests from fully realizing a planned return on investment.

Special export licenses are required for exports of some dual use products. Restricted dual use products are identified by the Department of Commerce on the Commerce Control List. The restrictions of the Commerce Control List apply to devices for which the function is unknown, which impacts devices such as programmable integrated circuits (ICs).

A programmable IC can include field programmable gate array (FPGA) logic, digital signal processors (DSPs), analog-to-digital converters (ADCs), digital-to-analog converters (DACs), one or more instruction processors (CPUs, GPUs etc.), and various I/O circuitry. As a programmable IC is programmable, the function of the device can be considered to be unknown and subject to restrictive regulations.

Grey market programmable ICs can also hurt sales by the makers of programmable ICs. Programmable ICs may sometimes be found on the grey market in a scenario in which the programmable ICs are sold by the maker to the buyer at a reduced price, the buyer is unable to use all the programmable ICs in the buyer's products, the buyer sells the programmable ICs at a discount to a reseller, and the reseller offers the programmable ICs at a price less than the price offered by the maker. The maker of the programmable ICs may have forecasted sales and planned production assuming that the programmable ICs sold to the buyer would not be on the market. The device maker may thereby suffer a loss in planned sales.

SUMMARY

In a method of restricting use of a programmable IC, one or more circuit designs are received from a customer by a provider of a general purpose programmable integrated circuit (IC). The provider generates one or more signed configuration bitstreams from the one or more circuit designs using one or more private keys of the provider. The provider changes the general purpose programmable IC into an application programmable IC that can only be programmed by the one or more signed configuration bitstreams. The application programmable IC and the one or more signed configuration bitstreams are provided from the provider to the customer.

A system for restricting use of a programmable IC includes a computer system having a processor and a memory. The memory is configured with instructions that when executed by the processor cause the processor to receive one or more circuit designs from a customer by a provider of a plurality of programmable ICs. The computer system generates one or more signed and encrypted configuration bitstreams from the circuit design using one or more private keys of the provider. The computer system further configures the plurality of programmable ICs into a plurality of application programmable ICs. Each application programmable IC is only programmable by the one or more signed and encrypted configuration bitstreams. The computer system provides the signed and encrypted configuration bitstream to the customer.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
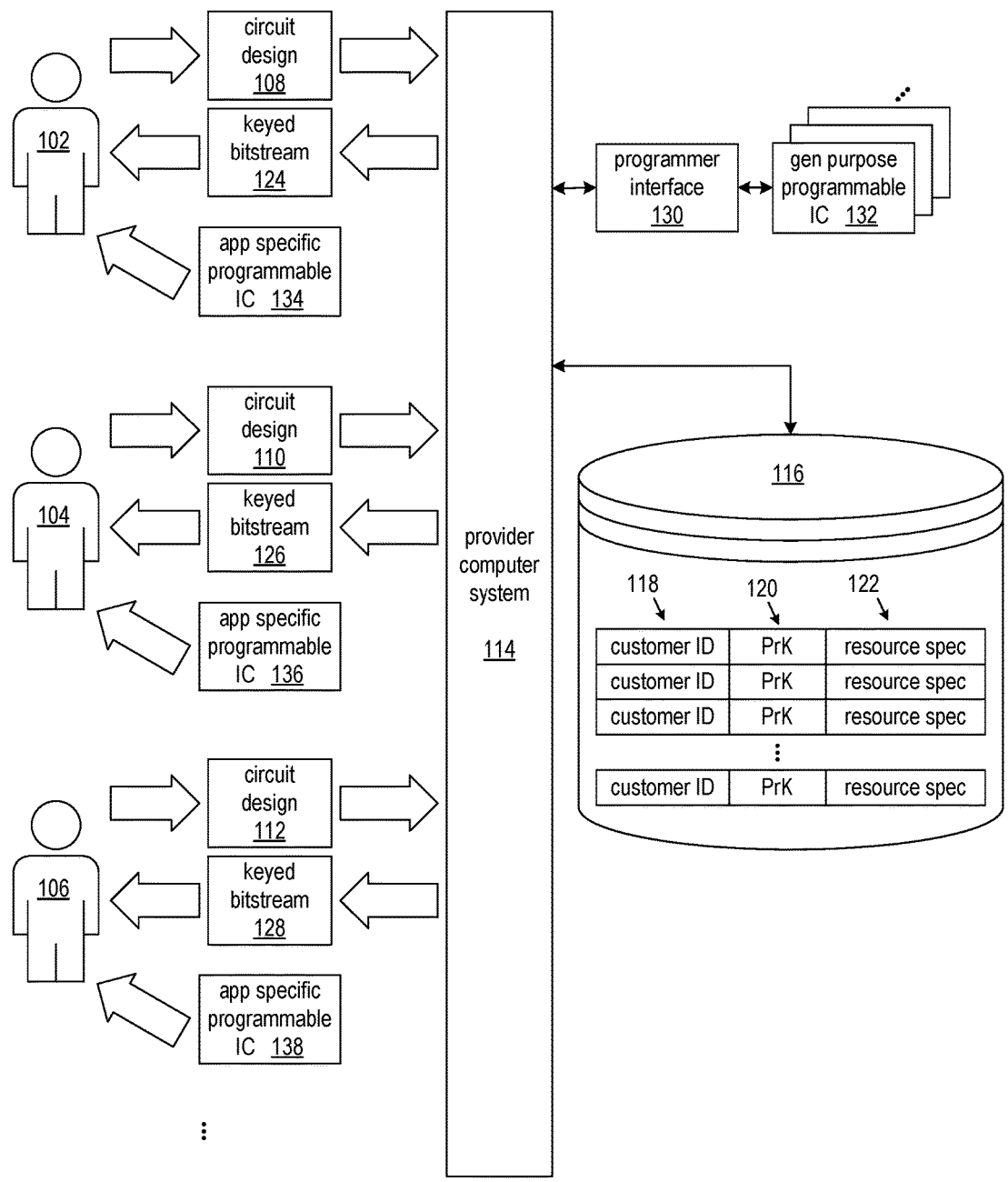
FIG. 1 shows a system in which a provider of programmable ICs makes general purpose programmable ICs into application programmable ICs based on customers' circuit designs.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems limit the uses of programmable ICs such that use of the programmable ICs cannot be considered unknown. If the use of a programmable IC is known, new markets may be available for sales of the programmable IC as the programmable IC would no longer be subject to the export controls that relate to devices whose function is unknown. The benefits accruing to the disclosed methods and systems extend beyond export controls to protecting against grey market sales and limiting the use of a programmable IC to a set of features of the programmable IC that have been agreed upon between the buyer and the seller.

According to the disclosed approaches, the provider of programmable ICs changes the programmable ICs from general purpose programmable ICs into application-specific programmable ICs that are usable for only a single or a limited set of applications. The provider of the programmable ICs receives a circuit design from a customer. The provider of the programmable ICs is a seller, and the customer is a purchaser of the programmable ICs. The provider generates one or more signed configuration bitstreams from one or more of the customer's circuit designs using one or more private keys known only to the provider. Each private key is a digital code used for encryption and/or authentication and can be generated using known approaches. Each signed configuration bitstream includes a digital signature that is a code generated from the configuration bitstream using the private key and the configuration bitstream in plaintext or encrypted using the private key. The provider changes the general purpose programmable IC into an application programmable IC that can only be programmed by inputting one of the one or more signed configuration bitstreams to the application programmable IC. To effect the change, the provider stores the one or more private keys in the programmable IC and permanently configures the programmable IC to force the programmable IC to authenticate an input bitstream. The provider can then make the one or more signed configuration bitstreams and the application programmable IC available to the customer.

FIG. 1 shows a system in which a provider of programmable ICs makes general purpose programmable ICs into application programmable ICs based on customers' circuit designs. Customers 102, 104, and 106 provide their respective circuit designs 108, 110, and 112 to the provider's computer system 114. The provider computer system is coupled to database 116, in which are maintained customer and/or circuit design identifiers 118, associated private keys 120, and optional associated descriptions 122 of resources of the programmable IC that the customers are authorized to use or are prohibited from using.

The provider computer system 114 generates keyed bitstreams 124, 126, and 128 based on the input circuit designs 108, 110, and 112 and the private keys associated with the customers or circuit designs, respectively. The keyed configuration bitstreams can be signed and/or encrypted with associated ones of the private keys 120.

The provider computer system is connected to a programmer interface 130 for changing the general purpose programmable ICs 132 into application-specific programmable ICs 134, 136, and 138. In an exemplary implementation, the programmer interface is a boundary scan interface through which one or more private keys can be scanned into the general purpose programmable IC. In addition, through the programmer interface the provider computer system configures the general purpose programmable IC to force authentication and/or only allow encrypted bitstreams. The key and control bit(s) can be permanently stored in the programmable IC in e-fuse registers, for example. A general purpose programmable IC is changed into an application programmable IC by way of configuring the general purpose programmable IC with a key and control bit that forces authentication/encryption.

The application programmable IC provided to the customer can only be programmed/configured by the keyed bitstream(s) associated with that programmable IC. For example, application specific programmable IC 134 can only be configured with keyed bitstream 124, application specific programmable IC 136 can only be configured with keyed bitstream 126, and application specific programmable IC 138 can only be configured with keyed bitstream 128. Any attempt to configure the application specific programmable IC with a bitstream other than the associated keyed bitstream(s) will fail. The number of application-specific programmable ICs configured by the provider system 114, associated with a particular keyed bitstream or set of keyed bitstreams and provided to a customer will vary according to customer requirements.

The provider can associate different private keys with different customers or with different circuit designs depending on customer and provider requirements. For example, a single private key may be associated with one exemplary customer for all the customer's different circuit designs. For another customer, each circuit design may have a different associated private key.

The customer can supply a customer identifier or a circuit design identifier to the provider computer system when needed to generate a keyed bitstream and application programmable ICs. Alternatively, the provider can generate the customer identifier or circuit design identifier for the customer. For each customer identifier or circuit design identifier, the provider generates a private key and stores the private key in association with the customer identifier/circuit design identifier in the database 116. One private key can be associated with multiple circuit designs of a customer.

In another aspect, the provider can restrict the resources of the programmable IC on which the customer's circuit design can be implemented. In one scenario, a general purpose programmable IC has many resources, and a customer may not need all of the resources to implement a circuit design. The provider may offer to sell the programmable IC to the customer at a reduced price as the customer does not need all the capabilities of the device. To prevent the customer from using resources of the programmable IC that the customer agreed to not use in exchange for the reduced price, the provider can restrict the customer's use of the resources of the programmable IC by changing the general purpose programmable IC into an application-specific programmable IC. Changing the general purpose programmable IC into an application-specific programmable IC also protects against grey market sales of the programmable IC.

In order to restrict the resources of the programmable IC on which the customer's circuit design can be implemented, the provider determines the resources of the programmable IC to which the customer has agreed to be limited. The resources of the programmable IC can be categorized as "authorized resources" and "non-authorized resources." The provider can associate a specification of the authorized resources or non-authorized resources with a customer identifier or a circuit design identifier in the database 116. When the customer orders programmable ICs from the provider for a particular circuit design, the provider determines whether or not the customer is authorized to use the resources of the programmable IC on which the circuit design is to be implemented. The provider can look up the resource specification 122 associated with the customer identifier/circuit design identifier 118 in the database 116. The resource specification can indicate authorized resources or non-authorized resources. The provider computer system 114 analyzes the customer's circuit design to determine the resources required for implementation. If the circuit design does not require any non-authorized resources (or uses only authorized resources), the provider system proceeds to change a general purpose programmable IC into an application-specific programmable IC as described above.

Figure 2:
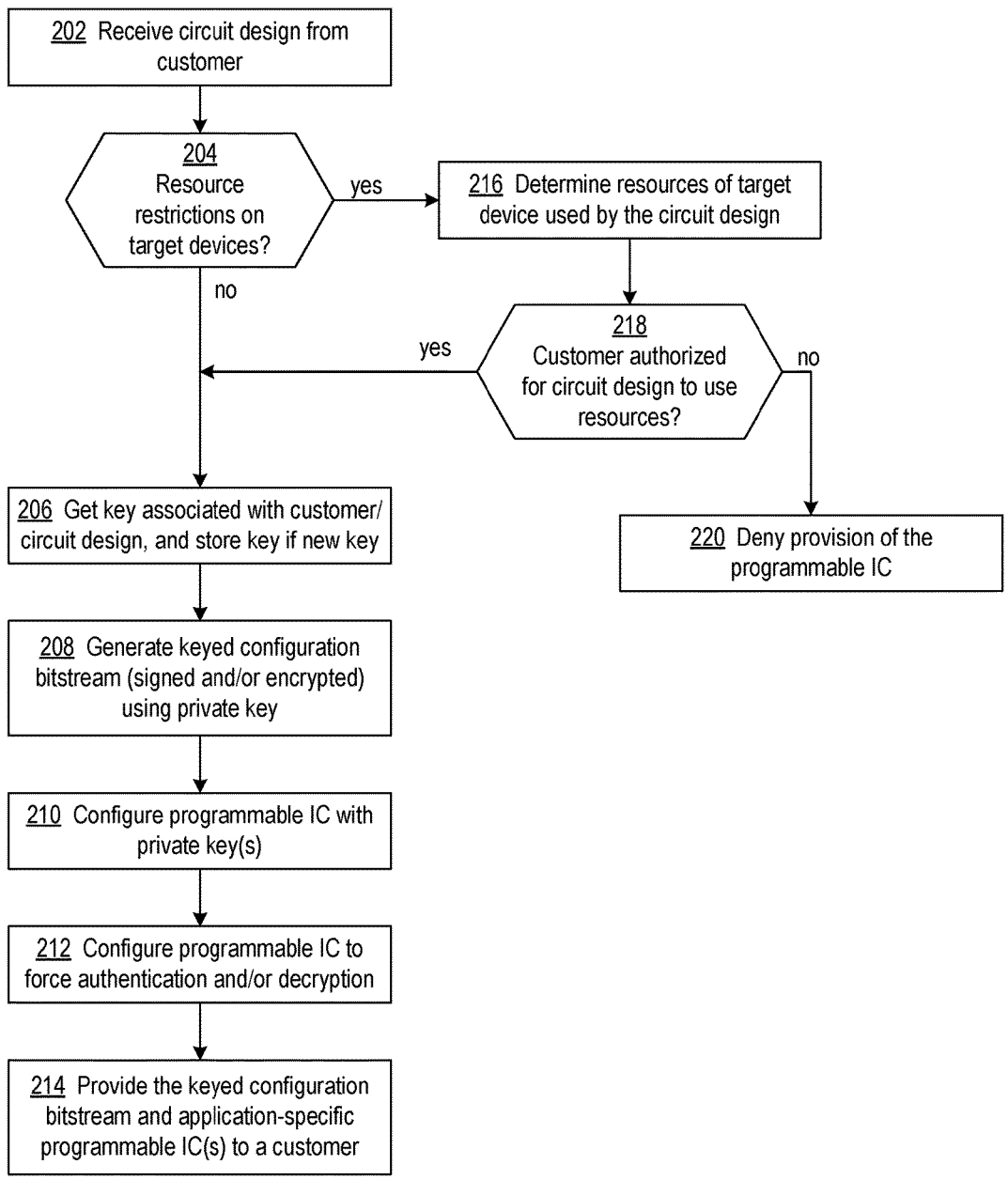
FIG. 2 is a flowchart of an exemplary process for changing general purpose programmable ICs into application programmable ICs.

FIG. 2 is a flowchart of an exemplary process for changing general purpose programmable ICs into application programmable ICs. At block 202, the provider computer system receives one or more circuit designs from a customer. The circuit design(s) may be a configuration bitstream generated by the customer or a netlist description, for example. The circuit design is targeted to a particular programmable IC ("target device") on which the customer desires the circuit design to be implemented.

Decision block 204 directs the process to block 206 if there are no resource restrictions on the target device. The provider system tracks which circuit designs of which customers are subject to resource restrictions by associating customer identifiers and circuit design identifiers with resource restrictions when the customer places an order.

At block 206, the provider system obtains a private key that is associated with the customer identifier or circuit design(s) of a customer. If a key has not yet been created, the provider system generates a key and stores the key in association with the customer identifier/circuit design identifier in the database. In an exemplary implementation, the key can be an Advanced Encryption Standard-Galois/Counter Mode (AES-GCM) key that provides both encryption and authentication. In an alternative implementation, an AES-GCM key can be used for encryption and a separate RSA key pair can be used for authentication. Those skilled in the art will recognize that other methods of encryption and/or authentication could be used.

At block 208, a keyed configuration bitstream is generated using the key obtained at block 206. The keyed configuration bitstream can be signed and/or encrypted according to implementation requirements. One or more general purpose programmable ICs are permanently programmed to include the private key(s) at block 210. The private key(s) can be burned into e-fuses of the programmable IC in one implementation.

At block 212, the general purpose programmable IC is configured to force authentication and/or decryption of an input configuration bitstream. Once configured, the programmable IC is an application-specific programmable IC as the programmable IC can only be programmed with the keyed bitstream generated at block 208. In an exemplary implementation, e-fuse control registers can be configured to force authentication and/or decryption. Multiple general purpose programmable ICs can be configured according the processing of blocks 210 and 212 to fill a customer order. Once configured as an application-specific programmable IC, the programmable IC can only be programmed with the keyed bitstream, and the function of the programmable IC is no longer unknown and may no longer be subject to certain export controls.

At block 214, the provider supplies the requested application-specific programmable ICs along the associated keyed bitstream to the customer.

Returning to decision block 204, if the general purpose programmable IC is subject to resource restrictions with respect to the customer, the provider system at block 216 determines the resources of the target device that would be used by the customer's circuit design.

In one approach, the customer can provide to the provider the circuit design in the form of a configuration bitstream. As the configuration bitstream is specifically formatted and the content indicates which resources of the programmable IC are to be configured, the provider system can determine which resources of the programmable IC would be required to implement the circuit design. If the customer provides a high-level circuit design, the provider system can process the circuit design through various circuit design tools to generate the configuration bitstream.

At block 218, the provider system determines whether or not the customer is authorized to use all the resources required for implementation of the circuit design. The provider system can compare the required resources to the resource specification 122 associated with the customer identifier/circuit design identifier stored in the database 116. If the circuit design requires any resources for which the customer is not authorized, the provider system denies provision of the programmable IC at block 220. Otherwise, processing continues at block 206 as described above.

Though the process of FIG. 2 is described in terms of one circuit design, it will be recognized that the process can be repeated for different circuit designs from the same customer and for different circuit designs from different customers. The provider system can use the same key or different keys for multiple circuit designs from the same customer. Different keys would be used for different customers. Also, the processing of blocks 208, 210, and 212 can be repeated for making multiple application programmable ICs based on the same circuit design and using the same private key. If the customer needs to apply an update of the circuit design to the application programmable IC, the customer provides the updated circuit design to the provider, the provider system generates an updated configuration bitstream using the private key associated with the customer identifier/circuit design identifier, and provides the updated configuration bitstream to the customer.

Figure 3:
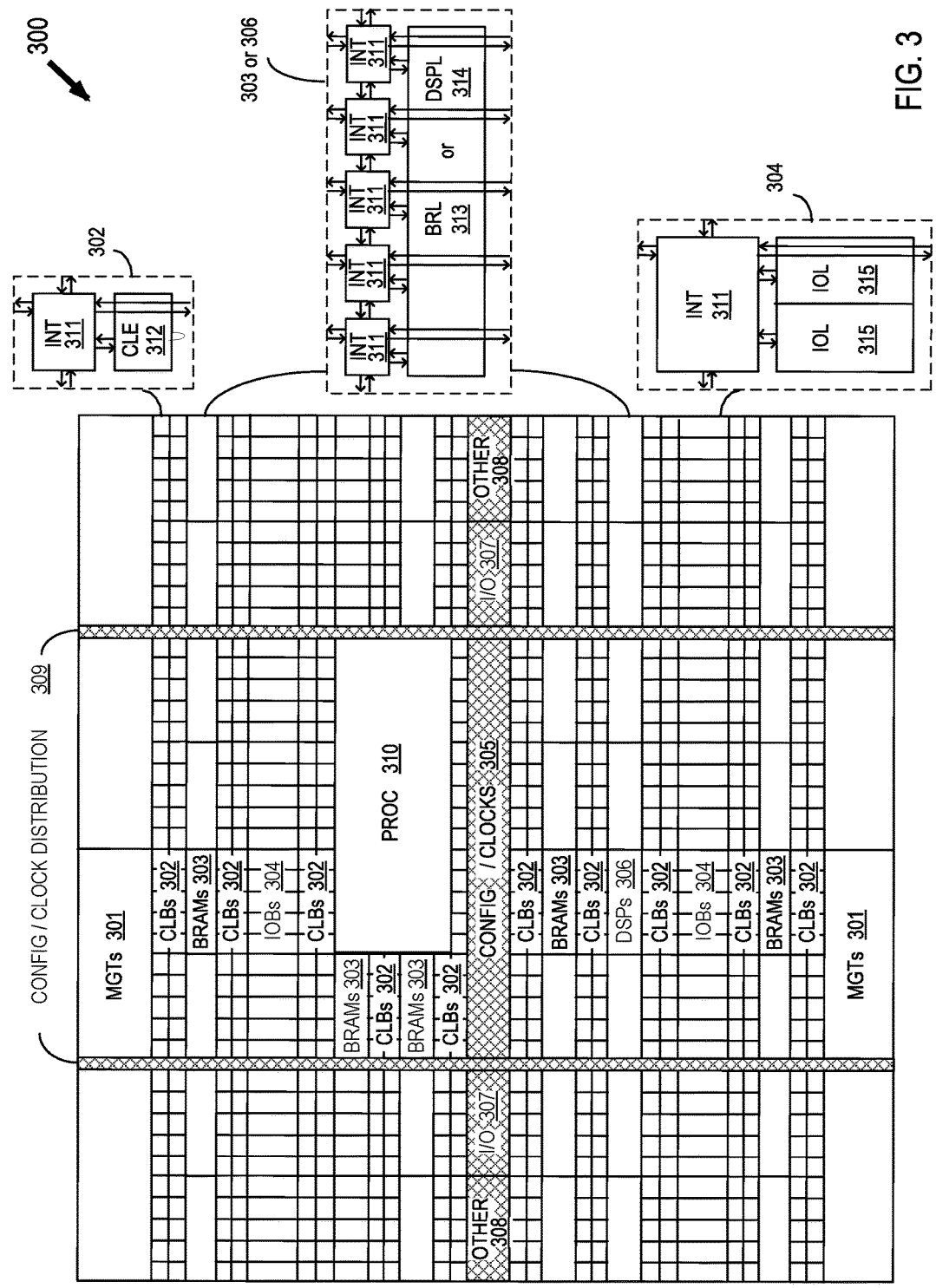
FIG. 3 shows a programmable integrated circuit that can be configured as a application programmable IC.

FIG. 3 shows a programmable integrated circuit (IC) 300 that can be configured as an application programmable IC. The programmable IC may also be referred to as a System On Chip (SOC) that includes field programmable gate array logic (FPGA) along with other programmable resources. FPGA logic may include several different types of programmable logic blocks in the array. For example, FIG. 3 illustrates programmable IC 300 that includes a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized input/output blocks (I/O) 307, for example, clock ports, and other programmable logic 308 such as digital clock managers, analog-to-digital converters, system monitoring logic, and so forth. Some programmable IC having FPGA logic also include dedicated processor blocks (PROC) 310 and internal and external reconfiguration ports (not shown).

In some FPGA logic, each programmable tile includes a programmable interconnect element (INT) 311 having standardized connections to and from a corresponding interconnect element in each adjacent tile. Therefore, the programmable interconnect elements taken together implement the programmable interconnect structure for the illustrated FPGA logic. The programmable interconnect element INT 311 also includes the connections to and from the programmable logic element within the same tile, as shown by the examples included at the top of FIG. 3.

For example, a CLB 302 can include a configurable logic element CLE 312 that can be programmed to implement user logic, plus a single programmable interconnect element INT 311. A BRAM 303 can include a BRAM logic element (BRL) 313 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element (DSPL) 314 in addition to an appropriate number of programmable interconnect elements. An 10B 304 can include, for example, two instances of an input/output logic element (IOL) 315 in addition to one instance of the programmable interconnect element INT 311. As will be clear to those of skill in the art, the actual I/O bond pads connected, for example, to the I/O logic element 315, are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 3 include additional logic blocks that disrupt the regular columnar structure making up a large part of the programmable IC. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual programmable IC, more than one adjacent column of CLBs is typically included wherever the CLBs appear, to facilitate the efficient implementation of user logic.

Figure 4:
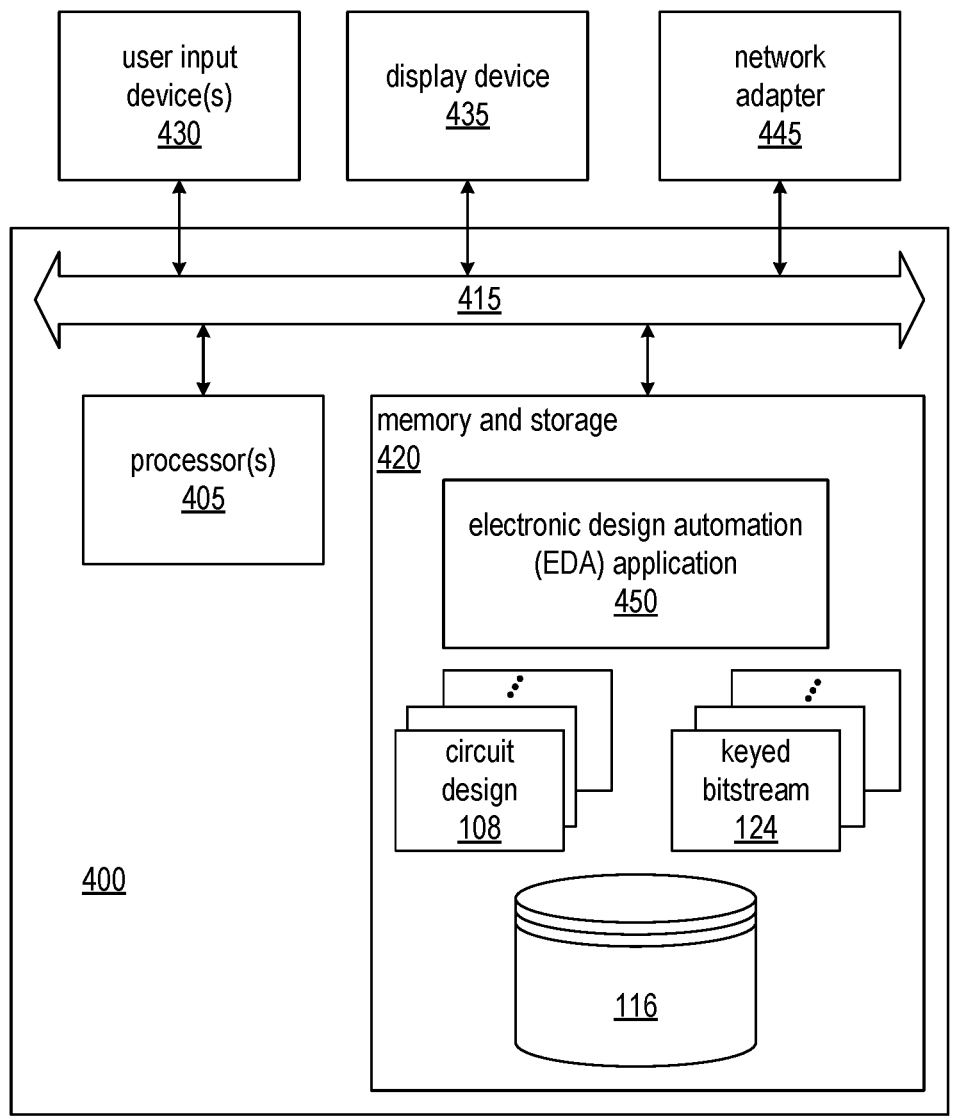
FIG. 4 is a block diagram illustrating an exemplary data processing system.

FIG. 4 is a block diagram illustrating an exemplary data processing system (system) 400. System 400 is an example of an EDA system. As pictured, system 400 includes at least one processor circuit (or "processor"), e.g., a central processing unit (CPU) 405 coupled to memory and storage arrangement 420 through a system bus 415 or other suitable circuitry. System 400 stores program code and circuit design 100 within memory and storage arrangement 420. Processor 405 executes the program code accessed from the memory and storage arrangement 420 via system bus 415. In one aspect, system 400 is implemented as a computer or other data processing system that is suitable for storing and/or executing program code. It should be appreciated, however, that system 400 can be implemented in the form of any system including a processor and memory that is capable of performing the functions described within this disclosure.

Memory and storage arrangement 420 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 400 may also include one or more cache memories (not shown) that provide temporary storage of at least some program code and data in order to reduce the number of times program code and data must be retrieved from local memory and persistent storage during execution.

Input/output (I/O) devices such as user input device(s) 430 and a display device 435 may be optionally coupled to system 400. The I/O devices may be coupled to system 400 either directly or through intervening I/O controllers. A network adapter 445 also can be coupled to system 400 in order to couple system 400 to other systems, computer systems, remote printers, and/or remote storage devices through intervening private or public networks. Modems, cable modems, Ethernet cards, and wireless transceivers are examples of different types of network adapter 445 that can be used with system 400.

Memory and storage arrangement 420 may store an EDA application 450. EDA application 450, being implemented in the form of executable program code, is executed by processor(s) 405. As such, EDA application 450 is considered part of system 400. System 400, while executing EDA application 450, receives and operates on circuit design 108. In one aspect, system 400 performs a design flow on circuit design 108, and the design flow may include synthesis, mapping, placement, routing, and the application of one or more physical optimization techniques as described herein. System 400 generates a keyed configuration bitstream 124 from circuit design 100.

EDA application 450, circuit design 100, circuit design 124, and any data items used, generated, and/or operated upon by EDA application 450 are functional data structures that impart functionality when employed as part of system 400 or when such elements, including derivations and/or modifications thereof, are loaded into an IC such as a programmable IC causing implementation and/or configuration of a circuit design within the programmable IC. Some implementations may be directed to a computer program product (e.g., nonvolatile memory device), which includes a machine or computer-readable medium having stored thereon instructions which may be executed by a computer (or other electronic device) to perform the disclosed processes.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for controlling use of programmable ICs. Other aspects and features will be apparent to those skilled in the art from consideration of the specification. It is intended that the specification and drawings be considered as examples only, with a true scope of the invention being indicated by the following claims.

What is claimed is:

1. A method comprising:
   receiving one or more circuit designs from a customer by a provider of a general purpose programmable integrated circuit (IC);
   determining resources of the programmable IC required to implement each of the one or more circuit designs;
   reading from a database a resource specification associated with the customer, wherein the resource specification indicates authorized resources and non-authorized resources of the programmable IC;
   determining whether implementation of the one or more circuit designs require only ones of the authorized resources or any of the non-authorized resources of the programmable IC; and
   in response to determining that implementation of the one or more circuit designs require only the ones of the authorized resources:
      generating one or more respective signed configuration bitstreams from the one or more circuit designs using one or more private keys of the provider;
      changing the general purpose programmable IC into an application programmable IC that can only be programmed by the one or more signed configuration bitstreams; and
      providing the application programmable IC and the one or more signed configuration bitstreams from the provider to the customer.

2. The method of claim 1, wherein the generating the one or more respective signed configuration bitstreams includes encrypting the one or more respective signed configuration bitstreams.

3. The method of claim 1, wherein the changing includes configuring the one or more private keys in e-fuses of the programmable IC.

4. The method of claim 1, wherein the changing includes configuring an e-fuse of the programmable IC to force authentication of an input configuration bitstream.

5. The method of claim 1, wherein:
the receiving the one or more circuit designs includes receiving a plurality of different circuit designs from the customer;
the generating includes generating a plurality of signed configuration bitstreams from the plurality of different circuit designs using a plurality of different keys, respectively;
the changing includes changing a plurality of general purpose programmable ICs into a plurality of application programmable ICs that can only be programmed by inputting the plurality of signed configuration bitstreams to the plurality of application programmable ICs, respectively; and
the providing includes the plurality of application programmable ICs and the plurality of signed configuration bitstreams to the customer.

6. The method of claim 1, wherein:
the receiving the circuit design includes receiving a plurality of different circuit designs from a plurality of different customers, respectively;
the generating includes generating a plurality of signed configuration bitstreams from the plurality of different circuit designs using a plurality of different keys, respectively;
the changing includes changing a plurality of general purpose programmable ICs into a plurality of application programmable ICs that can only be programmed by inputting the plurality of signed configuration bitstreams to the plurality of application programmable ICs, respectively; and
the providing includes the plurality of application programmable ICs and the plurality of signed configuration bitstreams to the plurality of customers, respectively.

7. The method of claim 1, further comprising:
determining whether or not the customer is authorized to use resources of the general purpose programmable IC required for implementation of the one or more circuit designs; and
generating the respective one or more signed configuration bitstreams, changing the general purpose programmable IC, and providing the application programmable IC only if the customer is authorized.

8. The method of claim 1, further comprising:
changing a plurality of general purpose programmable ICs into a plurality of application programmable ICs that can only be programmed by inputting the one or more signed configuration bitstreams; and
providing the plurality of application programmable ICs from the provider to the customer.

9. The method of claim 1, further comprising:
receiving a modification of one of the one or more circuit designs from the customer by the provider;
generating from the modification an updated signed configuration bitstream using the private key; and
providing the updated signed configuration bitstream from the provider to the customer.

10. The method of claim 1, further comprising reading from a database, the one or more private keys associated with an identifier of the customer.

11. The method of claim 1, further comprising reading from a database, the one or more private keys associated with one or more identifiers of the one or more circuit designs.

12. A system comprising:
a computer system that includes a processor and a memory, wherein the memory is configured with instructions that when executed by the processor cause the processor to perform operations including:
receiving one or more circuit designs from a customer by a provider of a plurality of programmable integrated circuits (ICs);
determining resources of the programmable IC required to implement each of the one or more circuit designs;
reading from a database a resource specification associated with the customer, wherein the resource specification indicates authorized resources and non-authorized resources of the programmable IC;
determining whether implementation of the one or more circuit designs require only ones of the authorized resources or any of the non-authorized resources of the programmable IC; and
in response to determining that implementation of the one or more circuit designs require only the ones of the authorized resources:
generating one or more respective signed and encrypted configuration bitstreams from the one or more circuit designs using one or more private keys of the provider;
configuring the plurality of programmable ICs into a plurality of application programmable ICs, each application programmable IC only programmable by the one or more respective signed and encrypted configuration bitstreams; and
providing the one or more respective signed and encrypted configuration bitstreams to the customer.

13. The system of claim 12, wherein the instructions for configuring the plurality of programmable ICs include instructions for configuring the one or more private keys in e-fuses of the plurality of programmable ICs.

14. The system of claim 12, wherein the instructions for configuring the plurality of programmable ICs include instructions for configuring e-fuses of the programmable ICs to force authentication of an input configuration bitstream.

15. The system of claim 12, wherein:
the instructions for receiving the one or more circuit designs include instructions for receiving a plurality of different circuit designs from a plurality of different customers, respectively;
the instructions for generating include instructions for generating a plurality of signed and encrypted configuration bitstreams from the plurality of different circuit designs using a plurality of different keys, respectively;
the instructions for configuring include instructions for configuring different pluralities of general purpose programmable ICs into different pluralities of application programmable ICs that can only be programmed by inputting the plurality of signed and encrypted configuration bitstreams to the different pluralities of application programmable ICs, respectively; and the instructions for providing include instructions for providing the plurality of signed and encrypted configuration bitstreams to the plurality of customers, respectively.

16. The system of claim 12, wherein the memory is further configured with instructions that when executed by the processor cause the processor to read from a database, the one or more private keys associated with an identifier of the customer.

17. The system of claim 12, wherein the memory is further configured with instructions that when executed by the processor cause the processor to read from a database, the one or more private key associated with one or more identifiers of the one or more circuit designs.

* * * * *